Sept. 26, 1939.   E. ORSHANSKY, JR   2,173,855
TRANSMISSION
Filed Jan. 24, 1935   4 Sheets-Sheet 1

INVENTOR
*Elias Orshansky, Jr.*
BY
ATTORNEYS

Sept. 26, 1939.   E. ORSHANSKY, JR   2,173,855
TRANSMISSION
Filed Jan. 24, 1935   4 Sheets-Sheet 2
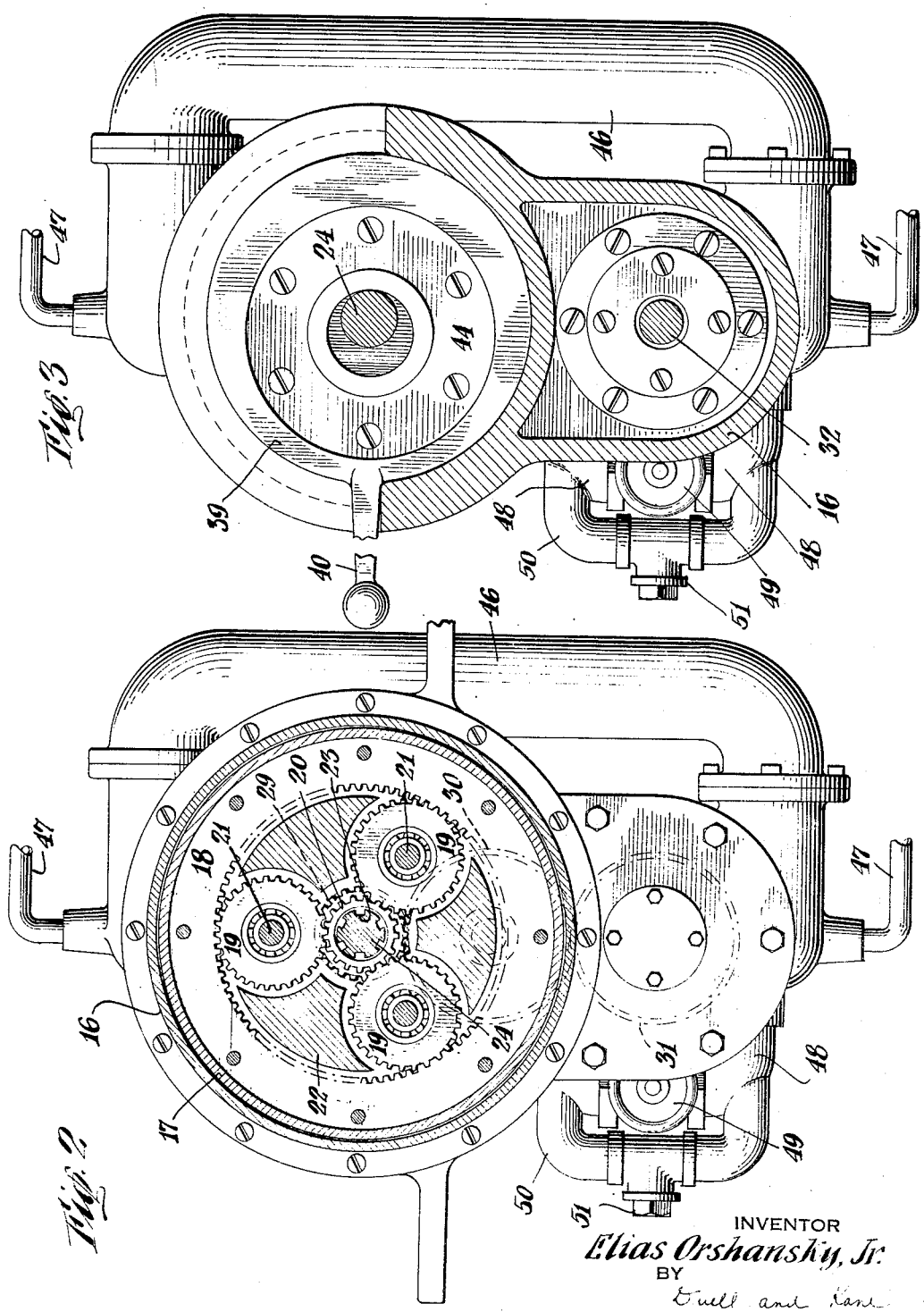
INVENTOR
*Elias Orshansky, Jr.*
BY
ATTORNEYS

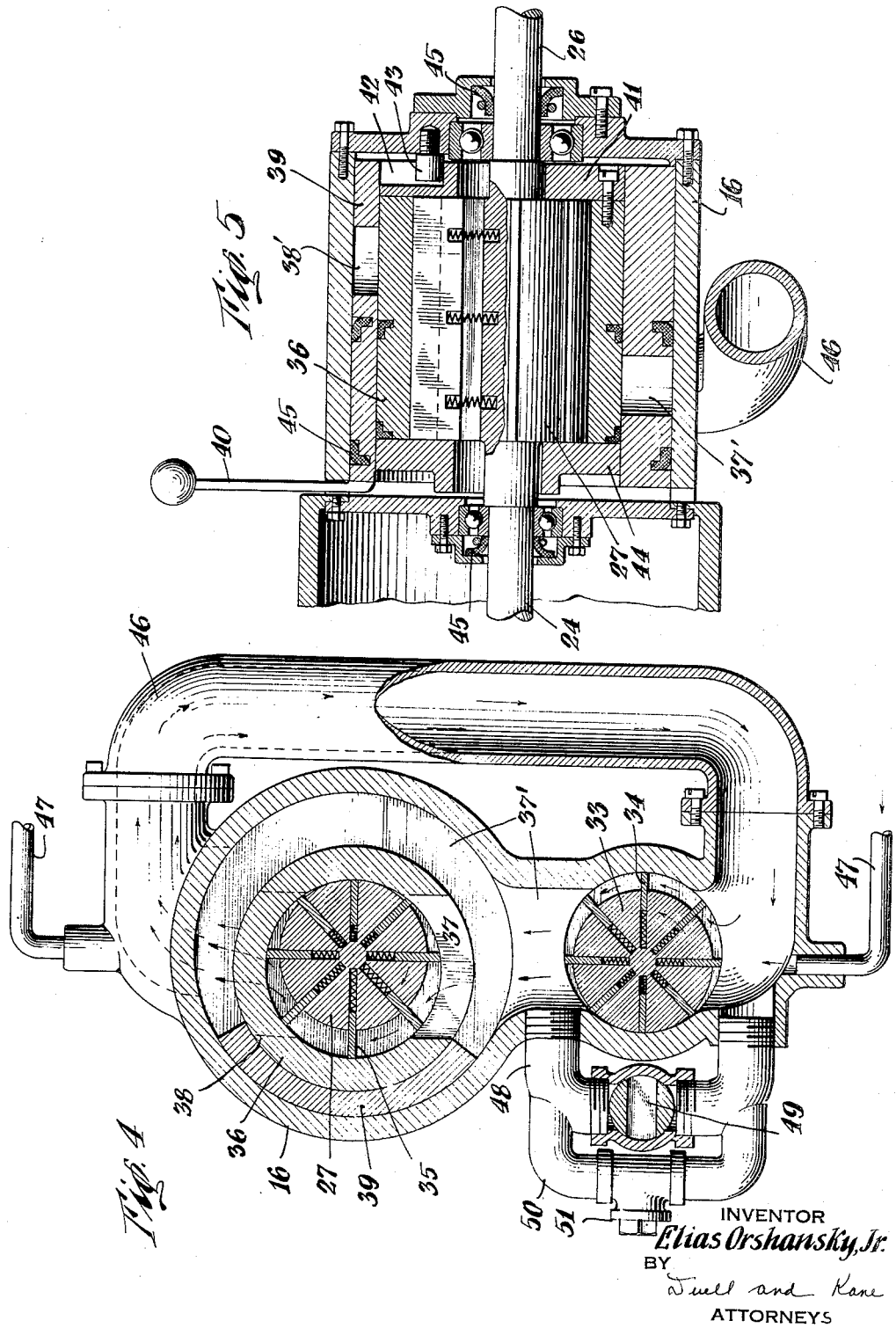

Sept. 26, 1939.     E. ORSHANSKY, JR     2,173,855
TRANSMISSION
Filed Jan. 24, 1935     4 Sheets-Sheet 4
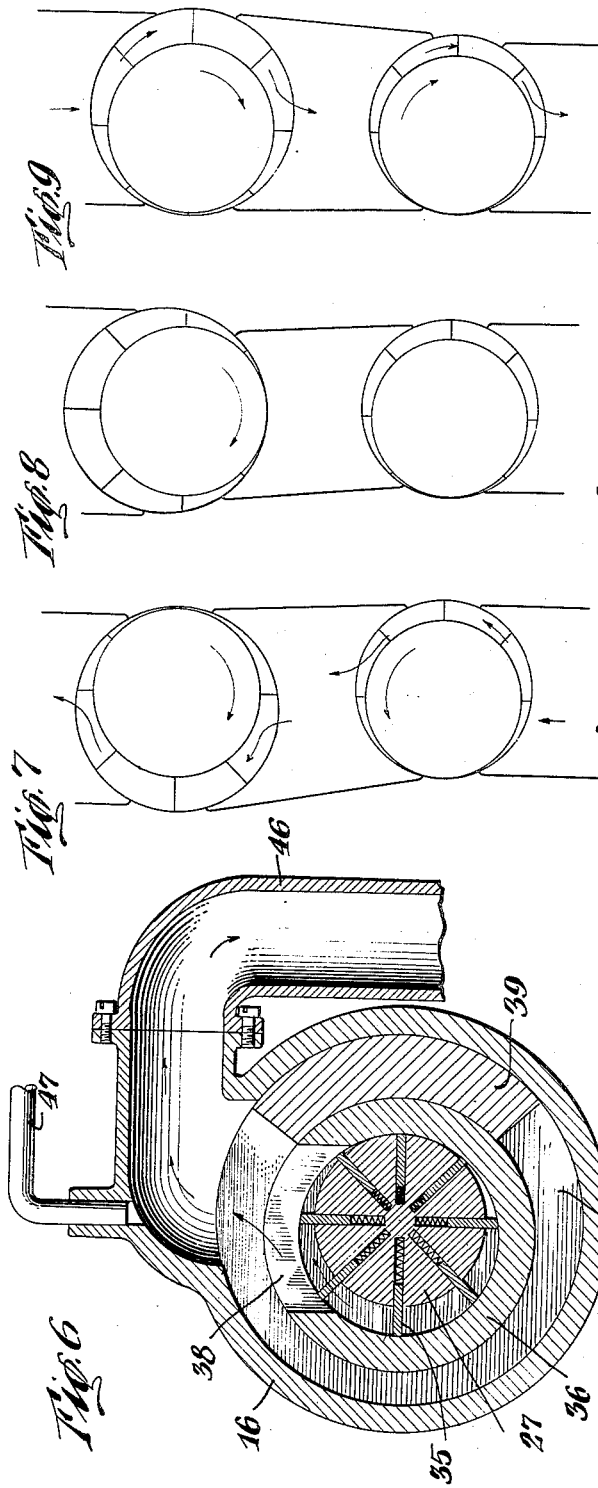
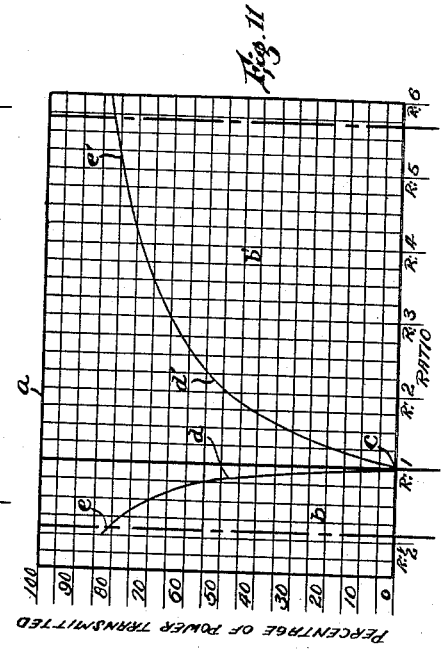
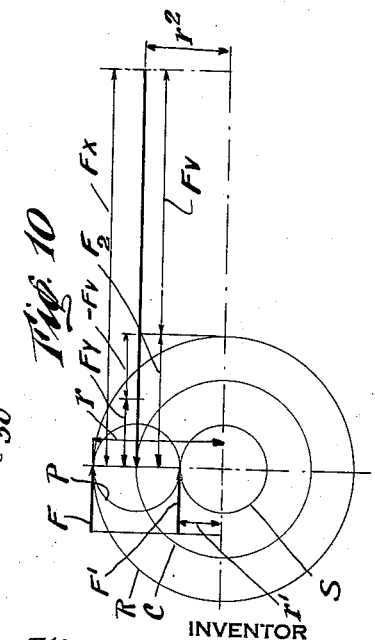
INVENTOR
*Elias Orshansky, Jr.*
BY
*Duell and Kane*
ATTORNEYS Patented Sept. 26, 1939

2,173,855

UNITED STATES PATENT OFFICE 2,173,855

TRANSMISSION

Elias Orshansky, Jr., New York, N. Y., assignor, by mesne assignments, to The Acrotorque Company, New Haven, Conn., a corporation of Connecticut Application January 24, 1935, Serial No. 3,204

9 Claims. (Cl. 74—189.5)

This invention relates to a structurally and functionally improved transmission capable of use in numerous different associations, but primarily intended for employment in installations where a drive involving a variable torque is present.

It is well appreciated by those skilled in the art that innumerable forms of mechanical and hyraulic transmissions have been designed and built and for the purpose of coupling a driving to a driven element in such manner that the speed and driving torque of the latter might be varied. In the case of mechanical transmissions (i. e., gears, chains and similar units of apparatus) entire satisfaction has been achieved where the driving and driven factors have not presented a value in excess of certain power sources and requirements. When these factors have been exceeded, it has been found that mechanical transmissions of the type afore outlined have been incapable of fulfilling the purposes for which they were designed. In the case of hydraulic transmissions certain units of apparatus have been developed which have been capable of providing a variable speed drive such that it was susceptible to being interposed between a driving shaft delivering high power and a driven shaft to be operated at varying speeds and under varying conditions of torque. However, transmissions of this type have offered the main objection that their over-all efficiency is low. Thus, the losses sustained have been so great as to more than outweigh the advantages of a transmission of this character.

With the foregoing in mind, it is current engineering practice to resort to an electrical transmission. In other words, one or more generators have been coupled to the driving shaft of a prime mover, and one or more motors have been coupled to the driven shaft or members, these motors being connected through suitable controls with the electrical generating apparatus so that a set-up of apparatus is furnished which permits of the operation of a driven member under variable speeds and under varying conditions of torque. A transmission involving an electrical drive also offers objections in that, among other factors, first, the apparatus is extremely expensive; second, the apparatus requires for its accommodation rather a large amount of space; third, the services of one or a number of highly skilled engineers are constantly necessary; and, fourth, the transmission is by no means completely efficient.

With the foregoing in mind, it is an object of the invention to provide a relative simple and high efficiency transmission which may be utilized in connection with installations which involve high power input and drive and by means of which, moreover, with the driving member of shaft operating under substantially constant speeds and power input, the driven member or shaft may operate at varying speeds and under varying conditions of torque.

A further object of the invention is that of furnishing a transmission which may be provided at relatively nominal cost and which may occupy a comparatively small amount of space, aside from the fact that no highly skilled engineers will be necessary to operate or assure a continued proper operation of the transmission.

The utility and value of an apparatus of this nature will be apparent when considering the same in connection with many different set-ups of apparatus. For example, in the case of so-called Diesel locomotives, it is obvious that such a transmission would enable engineers to design a vehicle of relatively small dimensions and low cost, and such that an ordinary railroad engineer could readily apply tractive force to the wheels of the locomotive and completely control the functioning of all operations of the apparatus within the body of the locomotive.

Viewed from a more specific aspect, it is still a further object of the invention to furnish a transmission which will include the most advantageous structural and functional features of a mechanical and a hydraulic transmission without, however, incorporating the disadvantages of these mechanisms as afore outlined.

Another object of the invention is that of furnishing a unit of this character which will embody relatively few parts, each individually simple and rugged in construction and which parts may be readily assembled to provide a unitary and highly efficient apparatus operating over long periods of time with freedom from difficulties.

With these and other objects in mind, reference is had to the attached sheets of drawings illustrating one practical embodiment of the invention, and in which:

Fig. 1 is a sectional side view of a transmission constructed in accordance with the teachings of this invention;

Figs. 2, 3 and 4 are transverse sectional views taken along the lines 2—2, 3—3, and 4—4 and in the direction of the arrows as indicated in Fig. 1;

Fig. 5 is a sectional plan view taken through the rear portion of the unit, along the lines 5—5 and in the direction of the arrows as shown in Fig. 1;

Fig. 6 is a fragmentary and transverse sectional view taken along the lines 6—6 and in the direction of the arrows as indicated in Fig. 1;

Figs. 7, 8 and 9 are views showing schematically the position which the parts assume under varying conditions of operation of the apparatus;

Fig. 10 shows diagrammatically the application of, and results following the operation of, certain of the units of the transmission as shown in the preceding figures; and Fig. 11 is a graph showing the manner in which the power is divided at different ratios.

Figure 1:
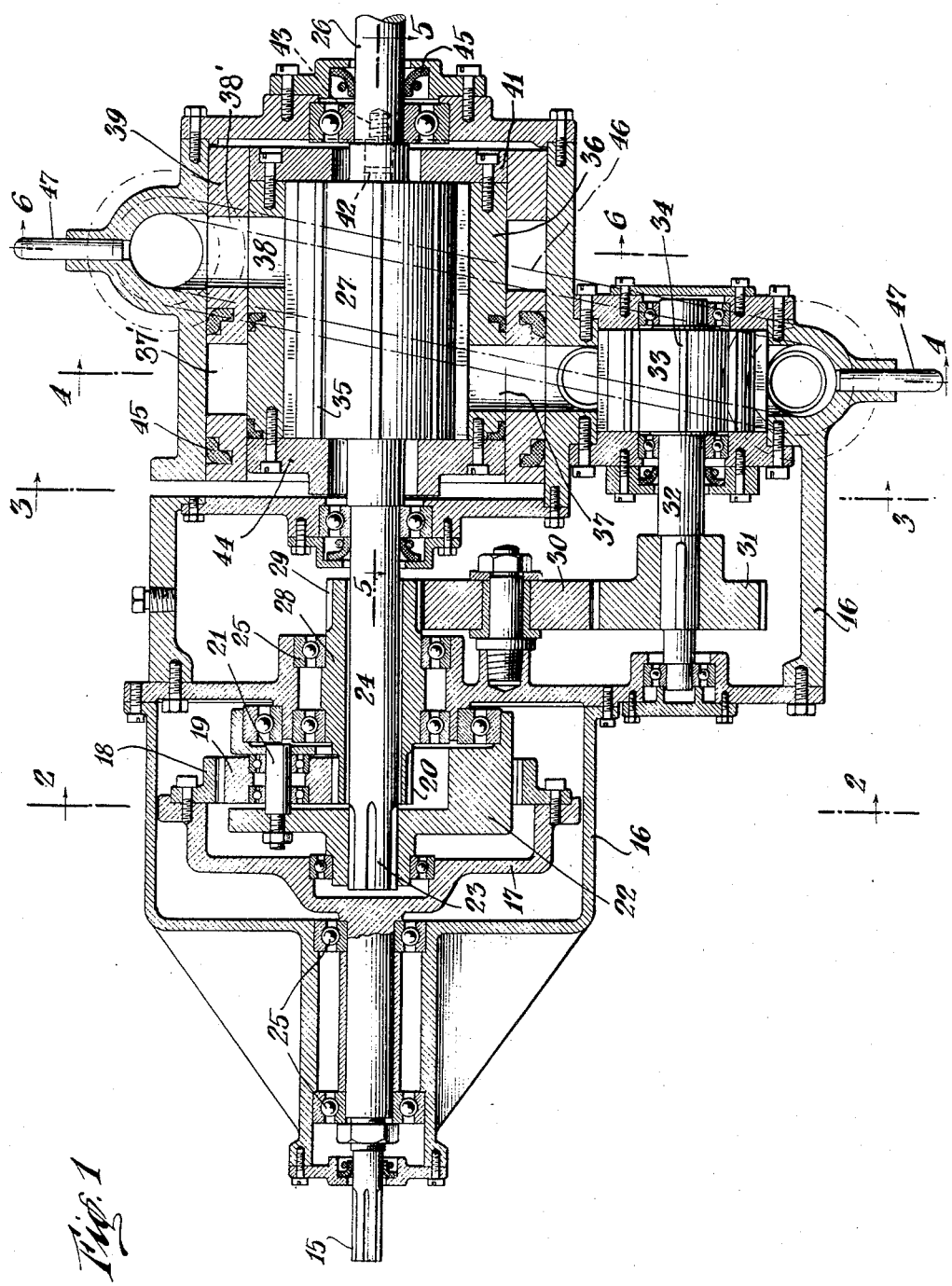

As afore noted, there is shown in the drawings merely one embodiment of the invention. It will be apparent that the transmission might include various structures embodying a mechanical and hydraulic system interconnected in such manner as to combine to the greatest extent the efficiency of a mechanical transmission or drive with the flexibility of a hydraulic transmission or drive. As will hereinafter appear, the illustrated embodiment includes a planetary differential system of three elements between any two of which a variable-torque hydraulic system is interposed or coupled in a manner such that there results variation of torque of the output shaft in inverse proportion to its speed and under substantially constant conditions of torque and speed of the input or driving shaft.

Thus, referring primarily to Figure 1, it will be seen that the driving shaft is indicated at 15, this shaft and the major portions of the apparatus being housed within a suitable casing 16. Coupled to the shaft is a member 17 of any desired configuration, and which serves as a mounting for a ring gear 18 having a series of inwardly extending teeth meshing with the teeth of three planet gears 19 which, in turn, mesh with the teeth of a sun gear 20. The planets 19 are mounted upon shafts 21, carried by a member of any suitable construction which has been identified at 22 and which is secured in any desirable manner as at 23 to a shaft 24. This arrangement of the parts will be clearly apparent upon referring to Figure 2, and at this time it will also be noted that the parts heretofore described, as well as those hereinafter referred to, may all be provided with suitable antifriction bearings as has been indicated at 25, and wherever such bearings should be conveniently placed.

Extending from the rear of the unit (i. e., the right-hand end as viewed in Figure 1) is a driven shaft 26. This shaft is, in effect, a continuation of shaft 24, there being interposed between these elements a rotor body 27, which will be hereinafter more particularly described. It is, of course, apparent that the shafts 24—26 and the rotor might be formed of three separate pieces of stock, and subsequently secured against movement with respect to each other, or, if convenient, they might be formed of a single piece of material.

The sun gear 20 forms a part of or is secured to a sleeve 28 encircling the shaft 24, and this sleeve is also formed with or has secured to it an annular series of teeth providing a gear 29. Meshing with the latter series of teeth is a gear 30 which serves to drive a gear 31 affixed to a shaft 32 rotatably mounted within the casing 16. The shaft 32 may form an integral part of a rotor 33. This rotor is disposed within an annular chamber formed in the casing 16 and mounts a radial series of blades 34, which may be spring projected to wipe against the inner face of the chamber. As a consequence of this construction, and having in mind that the axis of the shaft 32 is eccentrically disposed with reference to the chamber, a pump structure is furnished which, as indicated in Figure 4, will cause a flow of fluid in the direction of the arrows when the rotor 33 is turned in a counterclockwise direction.

Immediately beyond the chamber within which the rotor 33 is disposed, the casing is preferably formed with a chamber which, among other mechanism, accommodates the rotor 27. From the view under consideration, as well as Figures 1 and 5, it will be noted that the axis of the rotor 27 remains at all times centrally of the casing chamber. The rotor mounts a radial series of vanes 35 which, as shown, may be spring pressed, and these blades have wiping contact against the inner face of a ring shaped member or tube 36. The latter is formed with an opening 37 registering with the passage extending from the chamber in which the rotor 33 is disposed and is also formed with a passage 38 through which fluid may flow after having passed the rotor 27. As has been shown in these views and in Figure 6, there is interposed between the inner face of the casing chamber and the outer face of the tube or ring shaped member 36 a member 39. This member has openings 37' and 38' so that liquid may flow through the passages 37 and 38. Moreover, this member 30 has an eccentric bore snugly and slidably encircling the member 36. As a consequence, it will be understood that the member 36 in effect provides a pump or motor chamber, the position of which may be varied by simply rotating or shifting the member 39 which, with this in mind, is provided with an operating handle 40. In order that there may be no danger of the member 36 rotating with the member 39, the former may cooperate with or include any desirable structure which will limit its movements. One form of mechanism for use in this connection is that of providing a coupling between the plates 41 and/or 44 and the casing or fixed portion of the unit. The plates afore referred to, of course, provide in cooperation with the rotor and blades a complete pump or rotor structure. In the embodiment illustrated, only the plate 41 is formed with a guide or track 42. Riding within this guide is a pin 43 affixed to the rear cap or cover of the casing 16, and as a consequence it will be understood that while the handle 40 may be shifted to vary the effective position of the rotor 27 with respect to the chamber within which it is disposed, such shifting will actually not displace the axis of the rotor, but will merely cause the member 36 to be moved transversely from the position diagrammatically indicated in Figure 7 to the position similarly indicated in Figure 9, and through the position or station indicated in Figure 8. All these movements will be permitted by the pin and groove structure. Of course, as shown, both of these plates or their respective equivalents have openings of sufficient area as to accommodate the shafts 24—26, and irrespective of the position to which the member 39 has been moved.

It is obvious that the openings in the plates 41—44 might be guarded by a suitable packing structure (not shown). Additionally, the apparatus is preferably provided with packing at any desirable number of points where a structure of this nature may be provided; the packing having been indicated throughout the apparatus by the numeral 45. Additionally, it will be appreciated that while, for the sake of illustration, a series of independent vanes or blades have been shown in association with the rotors 27 and 33, these blades and/or the recesses accommodating the same might, in accordance with standard practice, be interconnected so that, in addition to preventing unnecessary compression of oil trapped within the recesses, the spring structure could be simplified and the compressive actions, to which the same are subjected, reduced. In such a construction, it will be appreciated that within the broad concept of the invention, the structure of the unit might, under given conditions, be modified, so that in lieu of a pump and motor structure embracing rotors, any other acceptable hydraulic substitute might be employed. Thus, it will be understood that while in most respects a preferred embodiment of the invention has been illustrated, many other substitute constructions could be employed, but (with the possible exception of a transmission in which provision for reverse driving is made), the unit, including the rotor 27, should be of variable volume, while the unit including the rotor 33 should be of fixed volume.

From the outlet side of the hydraulic portion of the transmission, the oil or other fluid may flow through a tube 46, this tube returning the oil to the intake side of the transmission as has been especially shown in Figures 2, 3, and 4. The tube 46 may be provided with a branch line 47 connecting with a gravity feed tank (not shown) which will serve to constantly maintain the same in filled condition.

In order to provide a suitable control for the transmission, a valve may be connected to the system. One convenient form of connection is that of providing a by-pass 48 which bridges the chamber within which the rotor 33 is disposed. In this by-pass a valve 49 is arranged, and a branch pipe 50 may be arranged in parallel with the tube 48, and be furnished with a safety relief valve 51 of the pressure type.

With a set-up of the parts as afore described, it will be appreciated that the driving shaft 15 may be coupled to a suitable prime mover operating at constant or variable speeds and, for example, with substantially constant power output, and the shaft 26 may be connected to a member to be driven, and which member presents varying factors of torque load and speed. If now the load is relatively great, and with the valve 49 open, it will be appreciated that the resistance offered by the shaft 26 will be so large that the initial turning of the shaft 15 and the parts 17 and 18 in association therewith will merely result in the planets 19 rotating, but will not result in a corresponding rotation on the part of the member 22. A rotation of the planets will, of course, serve to correspondingly move the sleeve 28 with respect to the shaft 24, and consequently the gears 29, 30 and 31 will cause the shaft 32 and rotor 33 to be turned. As afore stated, the valve 49 should, under these circumstances, be open. If, however, this valve is closed, and still assuming that the resistance to turning incident to the load on shaft 26 is extremely great, all that will occur will be that pressure will build up in the upper portion of tube 48, and so through tube 50 to unseat valve 51 and permit the fluid to flow back to either the tube 46 or 47. This, of course, would present an extremely unusual condition where the transmission is being subjected to a load for which it was not designed. This might conceivably occur where jamming resulted in the parts connected to the driven shaft 26. Under normal circumstances, however, and with the valve 49 at least partially opened, the pump, of which the rotor 33 forms a part, would build up pressure, and with the valve 49 gradually closed, this pressure would be increased to a point at which the motor, of which the rotor 27 forms a part, would be turned. Under all the foregoing conditions, the control handle 40 would be in the position diagrammatically exemplified in Figure 7.

A turning of the rotor 27, of course, results in a turning of the shaft 26. Likewise, it results in a turning of the shaft 24, and this consequently not alone allows the member 22 to rotate, but in fact compels the rotation thereof. Such rotation causes the planets 19 to be moved in their orbits, and under these circumstances we have the condition wherein the hydraulic side of the transmission is exerting from 100 to eighty per-cent. of the total driving force on the driven shaft 26, while the mechanical drive (through the shafts 24 to 26) is creating up to twenty per-cent. of the total driving force. This, of course, is under one given design of the parts, and different percentages would occur if the ratio of volume of the pump including the rotor 33 were changed with respect to the motor including the rotor 27. The operating handle 40 may gradually be shifted (as the speed of the driven shaft increases) through ninety degrees, so that the parts assume the position diagrammatically shown in Figure 8. During such shifting it will, of course, be apparent that in the examples heretofore given the percentage of power transmitted through the driven shaft 26 by the hydraulic side of the transmission will have been gradually decreasing, and the power transmitted through the mechanical side of the unit will have been gradually increasing. With the parts shown in the figure last referred to, substantially no power will be transmitted by the hydraulic side of the unit, and one hundred per cent. of the power to shaft 26 will be transmitted thereto from the shaft 15 through the member 17 and gears 19, which will be travelling around the now stationary sleeve 28 to drive the member 22 and consequently the shaft 24.

The operating handle 40 may now be shifted (either manually or automatically) until it assumes a position one hundred and eighty degrees removed from the position shown in Figures 3 and 7. At this point the parts are in the positions shown diagrammatically in Figure 9. In that figure it will be observed that the unit of transmission, including the unit 27, has now become a pump, and the unit, including the rotor 33, has become a motor. Consequently, under the drive of the shaft 24, fluid will be impelled from the upper chamber to the lower chamber, resulting in a driving of the shaft 32 which, through gears 31, 30 and 29, will cause the sleeve 28 to rotate. In view of the fact that this rotation parallels the orbital movement of the planets 19, the speed of such movement will be accelerated to correspondingly increase the rotational speed of the shaft 24.

From the foregoing it will be understood that the transmission is capable of causing the output shaft to rotate with varying speed and torque.

Furthermore, it will be seen that the amount of variation is dependent on the speed and direction of gear 20, and therefore pump rotor 33, which is connected with gear 20 by a positive mechanical drive. As the speed of the rotor 33 increases in either direction, more and more power will be transmitted by hydraulic means. Since at one point rotor 33 (and therefore gear 20) is stationary, no power is transmitted by hydraulic means at that point.

Insofar as available technical information indicates prior attempts to transmit power by two different systems in parallel, such as the above described mechanical-hydraulic system, have resulted in failure due to the fact that in actual practice the systems either worked in series, or the load imposed on the output shaft by the external resistance was transmitted to the input shaft, irrespective of the speed reduction ratio.

This becomes apparent when the force relations existing in a transmission which attempts to transmit power by two systems working in parallel are studied.

With reference to Fig. 10 it will be noted that this figure represents schematically the planetary differential gear train described above. R represents gear 18; P represents one of the gears 19; C represents member 22 in which the gears are mounted; and S represents the sun gear 20.

From the preceding description of the apparatus it will be seen that power is applied to shaft 15 and resistance to shaft 26. It is necessary to have the unit function in such a way that any change in torque acting on shaft 26, and therefore C in Fig. 10, is not transmitted to shaft 15, and therefore R in Fig. 10.

R represents the gear driven by the prime mover with a force, F acting at radius $r$. The resistance is represented by force $Fx$ acting at radius $r_2$. This resistance is variable. Consequently $Fx$ may assume any value.

It is the property of this gear train that due to a force F induced by the prime mover, a force $F_2$ equal to twice the force F will result at radius $r_2$, and will act on C.

Obviously, force $F_2$ will seldom be equal to force $Fx$. Consequently, any deviation in magnitude of $Fx$ from $F_2$ must be accomplished externally of the gears, as otherwise the resistance will cause a variation of torque of the driving shaft, which would render this transmission, in common with previous attempts to achieve the results, in effect a clutch rather than a transmission.

This variation is accomplished by making use of the power acting on the sun gear S, which is represented by force $F'$ acting at radius $r'$. Since sun gear 20 is mechanically connected to the pump including the rotor 33, the power available at S pumps oil into the motor including the rotor 27. This condition is represented by Fig. 7. Of course, this causes the hydraulic motor to add its force to the shaft 26, which, as noted above, is integral with C (member 22). Consequently, a force which is equal to that represented by force $Fv$ is added to $F_2$, their sum being equal to $Fx$. Since the motor is of a variable volume and capacity, the force $Fv$ is also variable, and under all circumstances is equal to:

$$Fv=(Fx-F_2); (Fx=F_2+Fv)$$

It may be that due to conditions of service, the resistance will decrease to a value such as $Fy$ acting at radius $r_2$, which may be less than $F_2$. In that event, force $Fv$ becomes negative, in order to retain the relation of $Fx=(F_2+Fv)$.

To make $Fv$ negative, the motor 27 becomes a pump, as shown in Fig. 9. Consequently, it will pump oil into 33, causing it to rotate in the direction shown in Fig. 9. This direction of rotation of 33 will cause C to rotate faster, and the power put into oil by 27 will be returned to the output shaft in the shape of increased speed of member C.

In Fig. 11 it is seen that the total power transmitted by the transmission, and represented by "100%," is divided into zone $a$ which is above the curve, and zones $b$ and $b'$ which are below the curve. Zone $a$ represents the power transmitted mechanically, and zones $b$ and $b'$ represent the hydraulically transmitted power. Taking point $c$ on the curve as the point described above at which gear 20 is stationary, it will be seen that no power is transmitted hydraulically. It is permissible to define this point as being 1:1 reduction. Consequently, when the driven shaft 26 rotates at half the speed shown at 1:1, the amount of rotation of gear 20, as described above, will be such as to cause half the power to be transmitted mechanically, and half the power hydraulically. This point is represented by $d'$.

If the shaft 26 is allowed to turn still slower, the amount of power transmitted by hydraulic means will increase; the amount of power transmitted by mechanical means will decrease, and the relation of power transmitted hydraulically to power transmitted mechanically will change, with regard to reduction ratio, as indicated by the curve $c—d'—e'$. Point $e'$ is the point at which the speed of shaft 26 is one-fifth of its speed at point $c$.

In the event that the shaft 26 is allowed to rotate faster than the arbitrarily assumed ratio 1:1 represented by point $c$, the amount of power transmitted mechanically and hydraulically will be represented by the curve $c—d—e$, point $d$ being the point at which the speed of shaft 26 is twice its speed at point $c$ and point $e$ being the point at which its speed is five times its speed at point $c$.

The position of member 39 determines the above relations as described before. Fig. 7 represents the position assumed by 39 when the relations shown by curve $c—d'—e'$ hold true. Fig. 8 represents the intermediate position of 39 which corresponds to point $c$ on the curve; and Fig. 9 represents the position of 39 when the relations shown by curve $c—d—e$ hold true.

The facts before outlined in connection with Figs. 10 and 11 are, of course, entirely disturbed and may be disregarded if an attempt is made to reverse the direction of rotation of the driven shaft of the transmission. The transmission illustrated in the embodiment of this invention is not intended or designed for an effective reverse driving. To provide for such apparatus, various changes in construction and in the proportion of the parts is desirable. However, reverse driving may be achieved by the present transmission under, for example, the following conditions:

First, the valve 49 is fully opened so that in effect no driving force will be transmitted by the hydraulic side of the transmission. Secondly, it is to be presumed that the driven shaft 26 is at that moment stationary. Third, the handle 40, or other control, will be shifted from the position shown in Figures 4, 5, 6 and 7 to the position shown in Fig. 9. Fourth, the engineer will now slowly close the valve 49. As a consequence the pump of which rotor 33 forms a part, will still act as a pump despite the position of the parts as shown in Fig. 9. This will be true because the direction of rotation of such rotor will be counterclockwise contrary to the indication of the arrow in this figure. With the motor of which the rotor 27 forms a part in the relative position with respect to the motor chamber as shown in this figure, this rotor will, of course, be moved in a counter-clockwise direction reverse to that indicated by the arrow and a reverse driving of the shaft will follow. Under such conditions, of course, the load on the driven shaft 26 will be relatively high.

From the foregoing it will be appreciated that among others the objects of the invention as specifically afore noted are achieved. It will be additionally understood that many changes in construction and design and rearrangement of the parts might be resorted to without departing from the spirit of the invention as defined by the claims.

Having thus described the invention, what is claimed is:

1. A transmission capable of delivering on the part of the output shaft driving torque in excess of that imparted to its input shaft, said transmission including a driving shaft, a driven shaft, a gearing assembly comprising three inter-meshing gears, two of the gears of said assembly being coupled to move with said driving and driven shafts, the third gear moving in response to relative movements of said first named gears and providing a reaction point for the same such that powers transmitted from said driving shaft to said driven shaft, a pump unit connected to said third gear to be driven thereby, a motor unit connected to said driven shaft, means providing an unobstructed passage from said pump to said motor whereby fluid will flow without reduction of pressure or volume from said pump to said motor, and means operable to vary the internal capacity of said motor unit, whereby said latter unit will function as a metering device to control the volume of fluid delivered by said pump.

2. A transmission capable of delivering on the part of the output shaft driving torque in excess of that imparted to its input shaft, said transmission including a driving shaft, a driven shaft, a gearing assembly comprising three inter-meshing gears, two of the gears of said assembly being coupled to move with said driving and driven shafts, the third gear moving in response to relative movements of said first named gears and providing a reaction point for the same such that power is transmitted from said driving shaft to said driven shaft, a pump unit connected to said third gear to be driven thereby, a motor unit connected to said driven shaft, means providing an unobstructed passage from said pump to said motor whereby fluid will flow without reduction of pressure or volume from said pump to said motor, and means operable to vary the internal capacity of said motor unit, said motor unit thereby functioning as a metering device to control the volume of fluid delivered by said pump, said pump unit when operating at constant speed, delivering a substantially invariable volume of fluid to said motor unit.

3. A transmission capable of delivering on the part of the output shaft driving torque in excess of that imparted to its input shaft, said transmission including a driving shaft, a driven shaft, a gearing assembly comprising three inter-meshing gears, two of the gears of said assembly being coupled to move with said driving and driven shafts, the third gear moving in response to relative movements of said first named gears and providing a reaction point for the same such that power is transmitted from said driving shaft to said driven shaft, a pump unit connected to said third gear to be driven thereby, a motor unit, both said units being of the positive displacement type and said motor unit being coupled to said driven shaft, means providing an unobstructed passage from said pump to said motor whereby fluid will flow without reduction of pressure or volume from said pump to said motor, and control means for varying the internal capacity of said motor unit, whereby said latter unit will function as a metering device to control the volume of fluid delivered by said pump.

4. A transmission capable of delivering on the part of the output shaft driving torque in excess of that imparted to its input shaft, said transmission including a driving shaft, a driven shaft, a gearing assembly comprising three inter-meshing gears, two of the gears of said assembly being coupled to move with said driving and driven shafts, the third gear moving in response to relative movements of said first named gears and providing a reaction point for the same such that power is transmitted from said driving shaft to said driven shaft, a pump unit connected to said third gear to be driven thereby, a motor unit connected to said driven shaft, means providing an unobstructed passage from said pump to said motor whereby fluid will normally flow without reduction of pressure or volume from said pump to said motor, means for varying the internal capacity of said motor unit, and means for adjusting said motor unit whereby the latter functions as a pump to drive said pump and cause the same to function as a motor, said motor unit normally functioning as a metering device to control the volume of fluid delivered by said pump.

5. A transmission capable of delivering on the part of the output shaft driving torque in excess of that imparted to its input shaft, said transmission including a driving shaft, a planetary gear assembly including a ring gear secured to said driving shaft, planet gears coupled to said driven shaft, and a sun gear meshing with the teeth of said planet gears, said sun gear providing a reaction point for said ring and planet gears such that driving force may be transmitted from said driving shaft to said driven shaft, a pump unit coupled to said sun gear to be operated thereby, a motor unit coupled to said driven shaft to turn the same, means providing an unobstructed passage from said pump to said motor whereby fluid will flow without reduction of pressure from the former to the latter, and means for varying the effective capacity of said motor unit.

6. A transmission capable of delivering on the part of the output shaft driving torque in excess of that imparted to its input shaft, said transmission including a driving shaft, a planetary gear assembly including a ring gear secured to said driving shaft, planet gears coupled to said driven shaft and a sun gear meshing with the teeth of said planet gears, said sun gear providing a reaction point for said ring and planet gears such that driving force may be transmitted from said driving shaft to said driven shaft, a pump unit coupled to said sun gear to be operated thereby, a motor unit, both said pump and motor being of positive displacement types, means for coupling said motor to said driven shaft to drive the latter, means providing an unobstructed passage from said pump to said motor whereby fluid will flow without reduction of pressure from the former to the latter, and means for varying the effective capacity of said motor unit.

7. A transmission capable of delivering on the part of the output shaft driving torque in excess of that imparted to its input shaft, said transmission including a driving shaft, a planetary gear assembly including a ring gear secured to said driving shaft, planet gears coupled to said driven shaft and a sun gear meshing with the teeth of said planet gears, said sun gear providing a reaction point for said ring and planet gears such that driving force may be transmitted from said driving shaft to said driven shaft, a pump unit coupled to said sun gear to be operated thereby, a motor unit, both said pump and motor being of positive displacement types, a rotary impeller forming a part of said pump, said motor being connected to said driven shaft to operate the latter, means providing an unobstructed passage from the impeller of said pump to said motor whereby fluid will flow without reduction of pressure or volume from said pump to said motor, and means for varying the effective capacity of said motor unit.

8. A transmission including, in combination, a driving and a driven shaft, a planetary gear assembly including relatively movable sun, ring, and inter-meshing planet gears, one of said gears being coupled to said driving shaft, another of said gears being coupled to said driven shaft, a pump unit, a motor unit, both of said units being of the positive displacement type and at least one of said units being of internal variable capacity whereby the volume of the fluid displaced by the same may likewise be varied and the fluid flow may be substantially interrupted, said motor being coupled to said driven shaft, means providing passages extending between said pump and motor to provide paths through which fluid may flow, free from reductions in pressure, from the exhaust side of said pump to the intake side of said motor, and the third gear of said planetary gear being connected to said pump to operate the latter, said variable capacity unit functioning as a metering device for said other unit.

9. A transmission including, in combination, a driving and a driven shaft, a planetary gear assembly including relatively movable sun, ring, and inter-meshing planet gears, one of said gears being coupled to said driving shaft, another of said gears being coupled to said driven shaft, a pump unit, a motor unit, means for adjusting the internal capacity of at least one of said units to vary the volume of fluid displaced thereby and to interrupt the flow of fluid therethrough, said motor being coupled to said driven shaft, means providing passages extending between said pump and motor, to provide paths through which fluid may flow, free from reductions in pressure, from the exhaust side of said pump to the intake side of said motor, the third gear of said planetary gear being connected to said pump to operate the latter, and means for controlling the fluid-varying and flow-interrupting means of said one unit, whereby to vary the ratio of, and interrupt the hydraulic transmission of power by said units and from said driving to said driven shafts, said one unit functioning as a metering device for said other unit.

ELIAS ORSHANSKY, Jr.